United States Patent
Hoogland

(10) Patent No.: US 7,035,713 B2
(45) Date of Patent: Apr. 25, 2006

(54) METHOD FOR FORMING CONTAINER RACKS

(75) Inventor: Hendricus Antonius Hoogland, Krommenie (NL)

(73) Assignee: Fountain Patents B.V.i.o., Ijssel (NL)

(*) Notice: Subject to any disclaimer, the term of this patent is extended or adjusted under 35 U.S.C. 154(b) by 0 days.

(21) Appl. No.: 10/475,259

(22) PCT Filed: Apr. 18, 2002

(86) PCT No.: PCT/NL02/00254

§ 371 (c)(1),
(2), (4) Date: Mar. 11, 2004

(87) PCT Pub. No.: WO02/085762

PCT Pub. Date: Oct. 31, 2002

(65) Prior Publication Data

US 2004/0143363 A1    Jul. 22, 2004

(30) Foreign Application Priority Data

Apr. 19, 2001 (NL) .................................. 1017878

(51) Int. Cl.
*G06F 7/00* (2006.01)
(52) U.S. Cl. ..................... 700/215; 700/113; 703/1
(58) Field of Classification Search ........ 700/113, 700/115, 214, 215, 217, 228, 229; 703/1
See application file for complete search history.

(56) References Cited

U.S. PATENT DOCUMENTS

| | | | | |
|---|---|---|---|---|
| 5,147,176 A | * | 9/1992 | Stolzer et al. | 414/807 |
| 5,335,601 A | * | 8/1994 | Matsumoto et al. | 104/88.01 |
| 6,035,245 A | * | 3/2000 | Conboy et al. | 700/214 |
| 6,602,037 B1 | * | 8/2003 | Winkler | 414/273 |
| 6,654,647 B1 | * | 11/2003 | Kal | 700/9 |
| 6,654,662 B1 | * | 11/2003 | Hognaland | 700/214 |
| 6,694,216 B1 | * | 2/2004 | Fujiki et al. | 700/213 |
| 6,766,282 B1 | * | 7/2004 | Schettine | 703/1 |

FOREIGN PATENT DOCUMENTS

| | | |
|---|---|---|
| DE | 197 10 075 | 9/1998 |
| WO | WO 01/07345 | 2/2001 |

* cited by examiner

*Primary Examiner*—Leo Picard
*Assistant Examiner*—Sheela S. Rao
(74) *Attorney, Agent, or Firm*—Hoffmann & Baron, LLP

(57) ABSTRACT

A method for forming an apparatus for storing and releasing containers (C1–C15) or such substantially box-shaped storing devices, comprising at least rails (28) having thereon a series of trolleys (14) mobile on the rails, on which trolleys the containers can be carried, the rails being supported by a supporting frame (54), which supporting frame is substantially built up from a series of standard modules, while, for a location, it is determined how many containers (7) are to be potentially storable therein, after which a construction for a supporting frame is determined on the basis of the modules, which modules are subsequently packaged and transported to said location, where the construction is built up from at least the modules.

12 Claims, 9 Drawing Sheets

| E | C8 | C7 | C6 | C5 | C4 | C3 | C2 |
|---|---|---|---|---|---|---|---|
| C9 | C10 | C11 | C12 | C13 | C14 | C15 | C1 |

Fig. 1c

| C9 | C8 | C7 | C6 | C5 | C4 | C3 | C2 |
|---|---|---|---|---|---|---|---|
| E | C10 | C11 | C12 | C13 | C14 | C15 | C1 |

Fig. 1d

|     |     |     |     |     |     |     |     |
| --- | --- | --- | --- | --- | --- | --- | --- |
| C9  | C8  | C7  | C6  | C5  | C4  | C3  | C2  |
| C10 | C11 | C12 | C13 | C14 | C15 | C1  | E   |

METHOD FOR FORMING CONTAINER RACKS

This application is the U.S. National Phase of International Application Number PCT/NL02/00254 filed on 18 Apr. 2002, which is incorporated herein by reference.

BACKGROUND OF THE INVENTION

This invention relates to a method for forming an apparatus for storing and releasing containers or like substantially box-shaped storing devices.

From practice, container racks are known in which containers can be stored. To that end, the containers are placed on trolleys, which trolleys can subsequently be moved over rails to displace the containers within the rack. In this manner, on a relatively small surface, many containers can be stored which, additionally, can be placed and moved in the rack and be taken out of the rack in a simple manner. This container rack is customarily built up by first pouring a foundation and subsequently placing a frame thereon, manufactured from steel sections. These sections are made to length in situ and welded together to form the desired frame.

When these known container racks are to be used in, for instance, harbors in remote places or places difficult to reach, it is often difficult to get the desired materials in the desired position. Additionally, there is often insufficiently qualified personnel to correctly build up these container racks. A further disadvantage of these known container racks is that building them up requires relatively much time and labor.

SUMMARY OF THE INVENTION

The object of the invention is a method for building up a container rack as described above, in which the disadvantages mentioned are avoided, while the advantages are maintained. To that end, a method according to the invention is characterized by the features of claim 1.

With a method according to the present invention, for a specific location, on the basis of inter alia numbers of containers to be processed, the desired configuration for the apparatus is determined remotely from the respective location, after which, preferably with the aid of a computer, a parts list is made of the necessary modules for the respective apparatus. Further, a foundation is calculated, which can be manufactured in situ. The modules and trolleys to be used in the apparatus are packaged, in particular in containers, and subsequently brought to the desired location, where the apparatus is built up from the modules on the then formed foundation. Subsequently, the packages of the modules, in particular containers, can be used for storage and transport of goods, at least from the location where the apparatus has been built up. With such a method, in a particularly simple manner, an apparatus for storing and releasing containers or like storage devices can be built up relatively rapidly. Additionally, immediately after the construction, storage and transport capacity are present, in particular when standard containers have been used for transport of the modules.

In a particularly advantageous embodiment, a method according to the invention is further characterized by the features of claim 8.

What is obtained with such a method is an arrangement of at least two container racks, such that they can be very easily approached with a minimum of auxiliary means and a minimum of required space. Optionally, the means for moving the containers may already be used when building up the construction.

The invention further relates to a method for loading and unloading containers or like storing devices, characterized by the features of claim 9.

With such a method, in a particularly simple and suitable manner, containers can be stored in container racks and be located in order to be taken out. This means that from one or more central locations, trucks can simply be directed to suitable container positions for delivering or picking up specific containers, based on the position indication numbers. Preferably, such a method is carried out practically automatically with the aid of a computer.

The invention further relates to an apparatus comprising a series of container racks and a computer, characterized by the features of claim 11.

Such an apparatus offers the advantage that in a particularly simple and practical manner, containers can be stored in and removed from container racks on the basis of container positions recorded in the computer and the identification numbers of the containers already positioned or to be positioned therein. Such an apparatus offers great logistic advantages. Additionally, for the identification numbers of the different containers, use can be made of means already present in the containers, for international positioning systems such as GPS. It is preferred that the container positions, at least the trolleys, are provided with means for communication with the computer, such that, at all times, the position of each trolley within the container racks can be determined, while operating means for moving the trolleys can be controlled with the aid of the computer. Thus, the use of such an apparatus is simplified still further.

In the further subclaims, further advantageous embodiments of a method and apparatus according to the invention are described.

BRIEF DESCRIPTION OF THE DRAWINGS

In elucidation, exemplary embodiments of a method and apparatus according to the present invention will be further explained on the basis of the drawing.

In the drawing:

FIGS. 1a–1e schematically show a part of a container rack according to the invention;

FIG. 2 shows, in side view, the part of the container rack according to FIG. 1;

DETAILED DESCRIPTION OF THE INVENTION

Figure 1A:
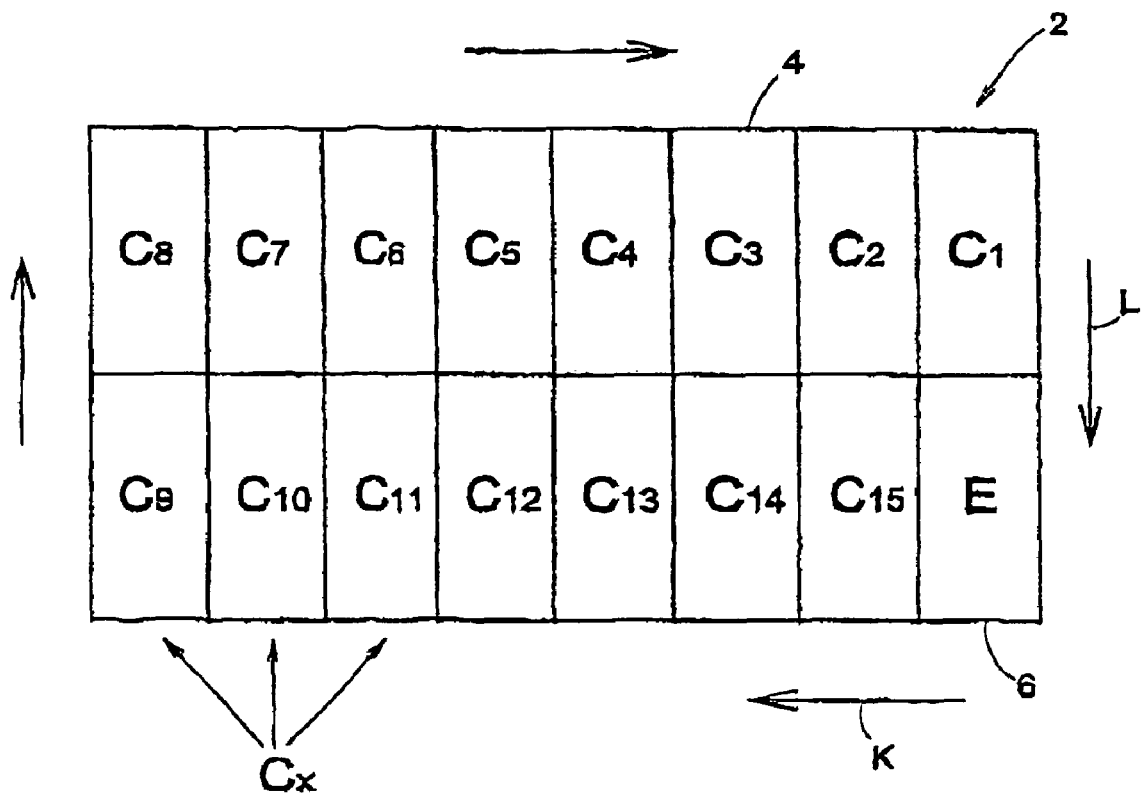

In this description, the starting point is the structure of an apparatus for storing, transporting and removing containers or like storing device as described in Dutch patent 1012682 and the corresponding international patent application PCT/NL00/00518, which publications are understood to be incorporated herein by reference. Naturally, with a method according to the present invention, other types of container racks or the like can be built up. Identical or corresponding parts have identical or corresponding reference numerals.

Figure 1B:
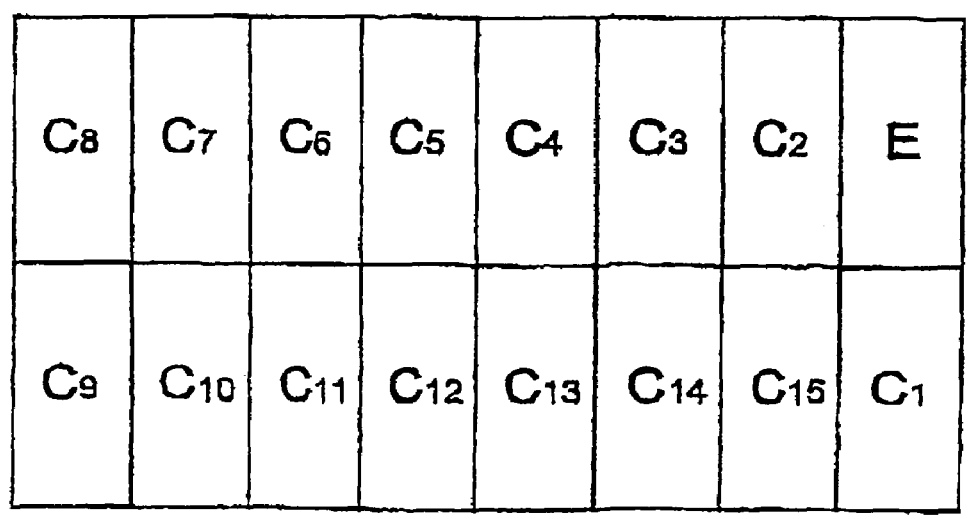
Figures 1E, 2:
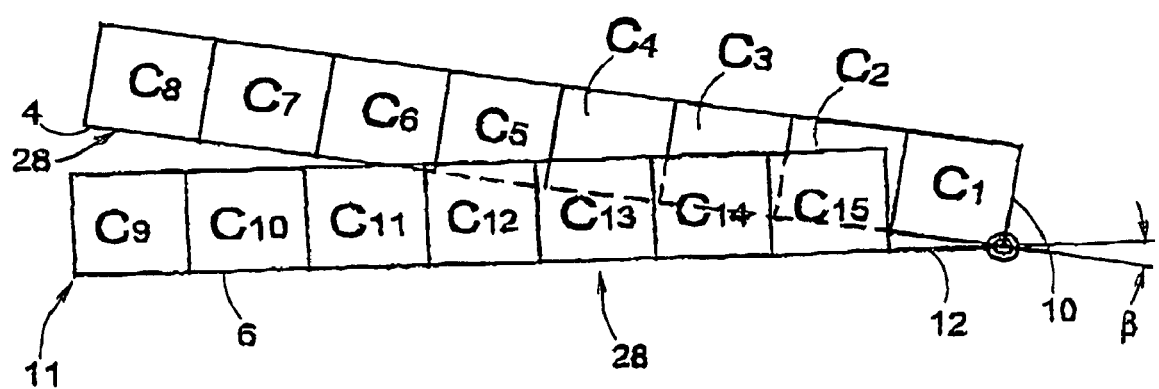
Figure 3:
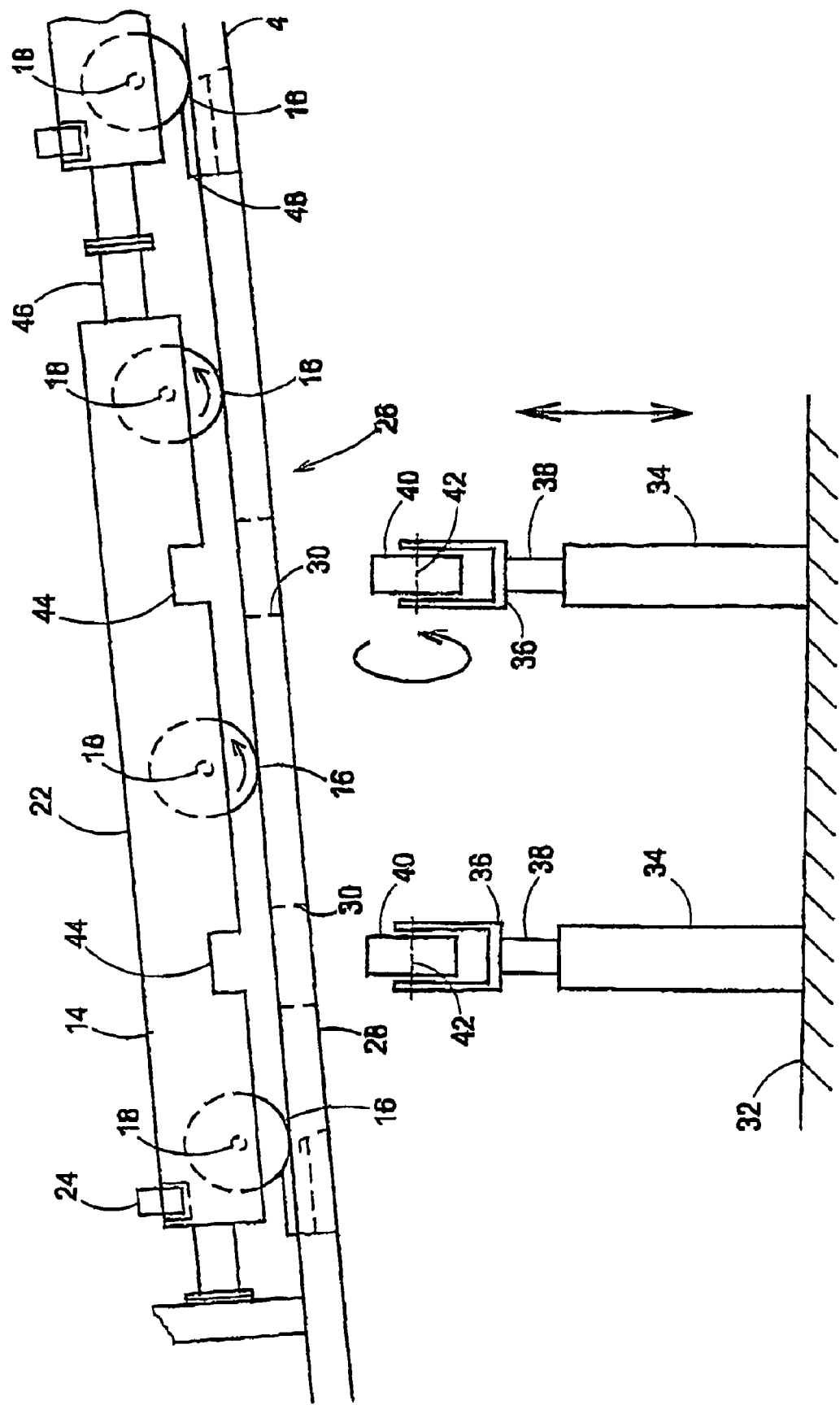
FIG. 3 shows, in side view, the end of a path of a container rack according to FIGS. 1 and 2 with a trolley thereon.
Figure 4:
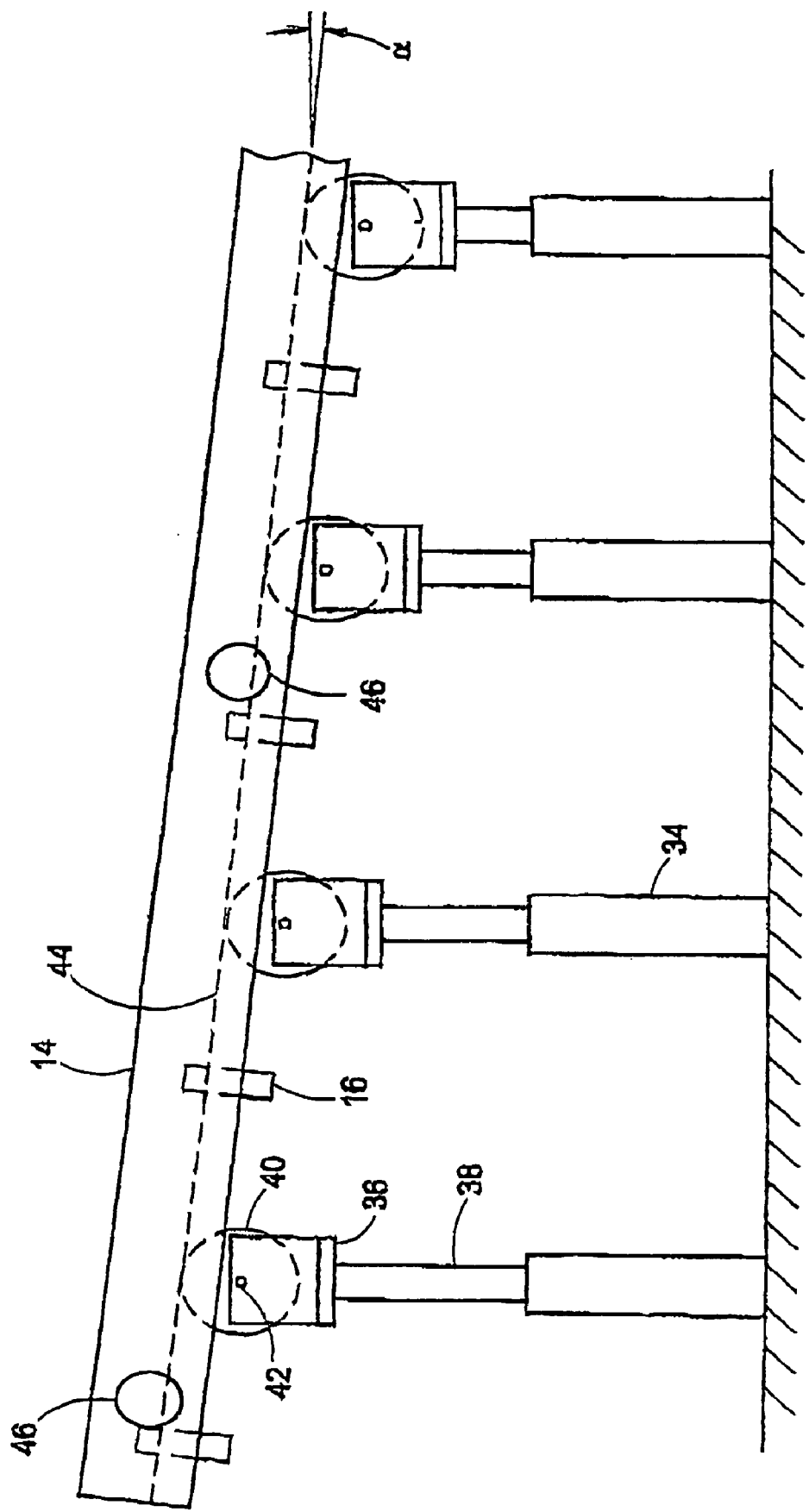
FIG. 4 shows, in front view, a transverse guiding of the container rack according to FIG. 8.

In FIGS. 1a–1e, a unit 2 of container arrangement positions $C_x$ with containers C1–C15 is shown, with one empty container arrangement position E. The containers C1–C15 are arranged in two rows, 4, 6, parallel to each other. In side view, the two rows 4, 6 show an inclination relative to each other, the angle of inclination being represented, for clarity's sake, in an exaggerated manner in FIG. 2. Each container C1–C15 is positioned on the upper surface 22 of a trolley 14, a blocking cam 24 being provided for blocking the container. The trolley 14 is carried on rails 28 with the aid of wheels, bearing-mounted about horizontally extending axes 18, while adjacently disposed trolleys 14 are kept at a mutual distance from each other by shock elements 46. With the aid of the trolleys 14, the containers C1–C15 can be ridden over the rails 28 to the lower end thereof, parallel to the longitudinal direction of the rows 4, 6, as indicated by first arrows K. From the position shown in FIG. 1a, the first container C1 can be moved in the direction L, at right angles to the longitudinal direction of the rails 28, to the empty container arrangement position E. To that end, with the aid of wheels 40, vertically adjustable via piston-cylinder assemblies 34, 38, carried in trestles 36, and rotatable about horizontal axes 42 extending parallel to the rails 28, the trolley 14, on which the first container $C_1$ rests, is lifted off the rails 28 with the wheels 16, as is indicated in FIG. 4. A series of piston-cylinder assemblies 34, 38 with wheels 40 extends in the direction of the arrow L, while in the bottom side of the trolley 14, grooves 44 are provided, in which the wheels can be guided. By moving up the wheels 40 situated farthest from the empty container arrangement position, over the largest distance possible, an angle of inclination α is obtained between the trolley 14 and the container $C_1$, so that the trolley, guided by the grooves 44 and the wheels 40, will ride to the empty container arrangement position E, as shown in FIG. 1b. Then, in FIG. 1 on the right side of the top row 4, an empty container arrangement position E is obtained. The trolley 14 is brought back on the rails 28 of the respective row 6 on the lower right side in FIG. 1b, by returning the respective piston-cylinder assemblies 34, 38 to a retracted position, so that the wheels 40 are pulled from the grooves 44 and the wheels 16 rest on the respective rails 28. When the trolleys 14 of the containers C2–C8 as shown in FIG. 1b are released, as a result of the angle of inclination β of the rails 28 of the first row 4 and the second row 6 of containers C, these containers will move down one place in the direction of the lower end 10 of row 4, so that the empty container arrangement position E is situated in the left upper position in FIG. 1c, next to the last container C9 in the second row 6. Subsequently, in a comparable manner, the container C9 can be moved to the empty container arrangement position mentioned, behind the last container C8 in the first row 4, as shown in FIG. 1d, after which containers C1 and C15–C10 can each move down one place in the direction of the lower end 11 of the second row 6. In this manner, the containers C1–C15 can be rotated on the sixteen container arrangement positions in the rows 4, 6. Containers C can be released in a simple manner from the first and/or the second row, for instance near the ends of the respective rows 4, 6. Additionally, when fewer than fifteen containers are present in the sixteen arrangement positions, containers can be added on empty trolleys 14. For the construction of the rails, trolleys, piston-cylinder assemblies and the like, as well as for the further elaboration of the earlier described rotation system of the containers C1–C15 and the empty container arrangement position E, specific reference is made to the earlier mentioned Dutch patent 1013683 and the international patent application PCT/NL00/00518, incorporated herein by reference.

Figure 9:
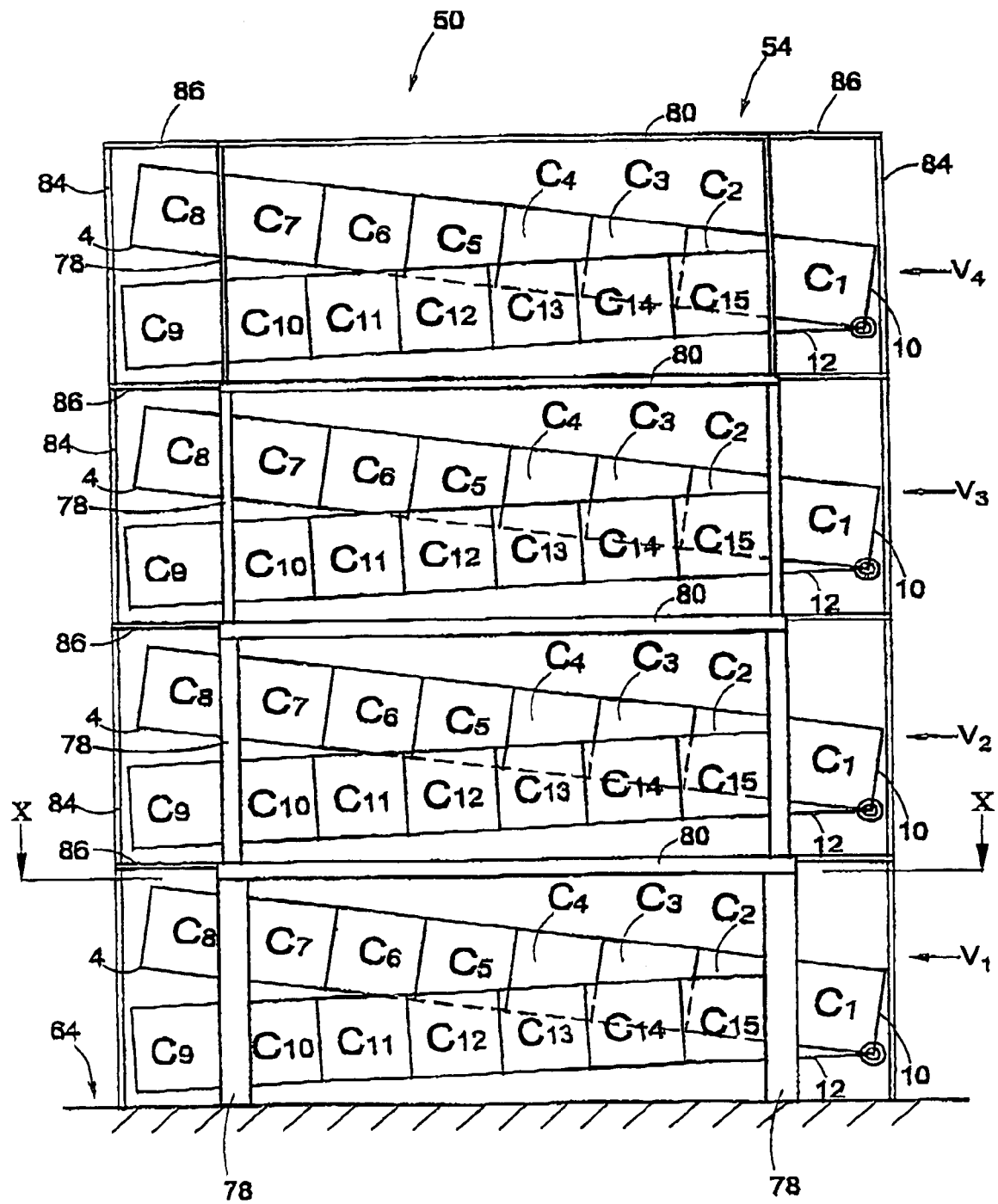
FIG. 9 schematically shows, in side view, a part of a container rack according to the invention.
Figure 10:
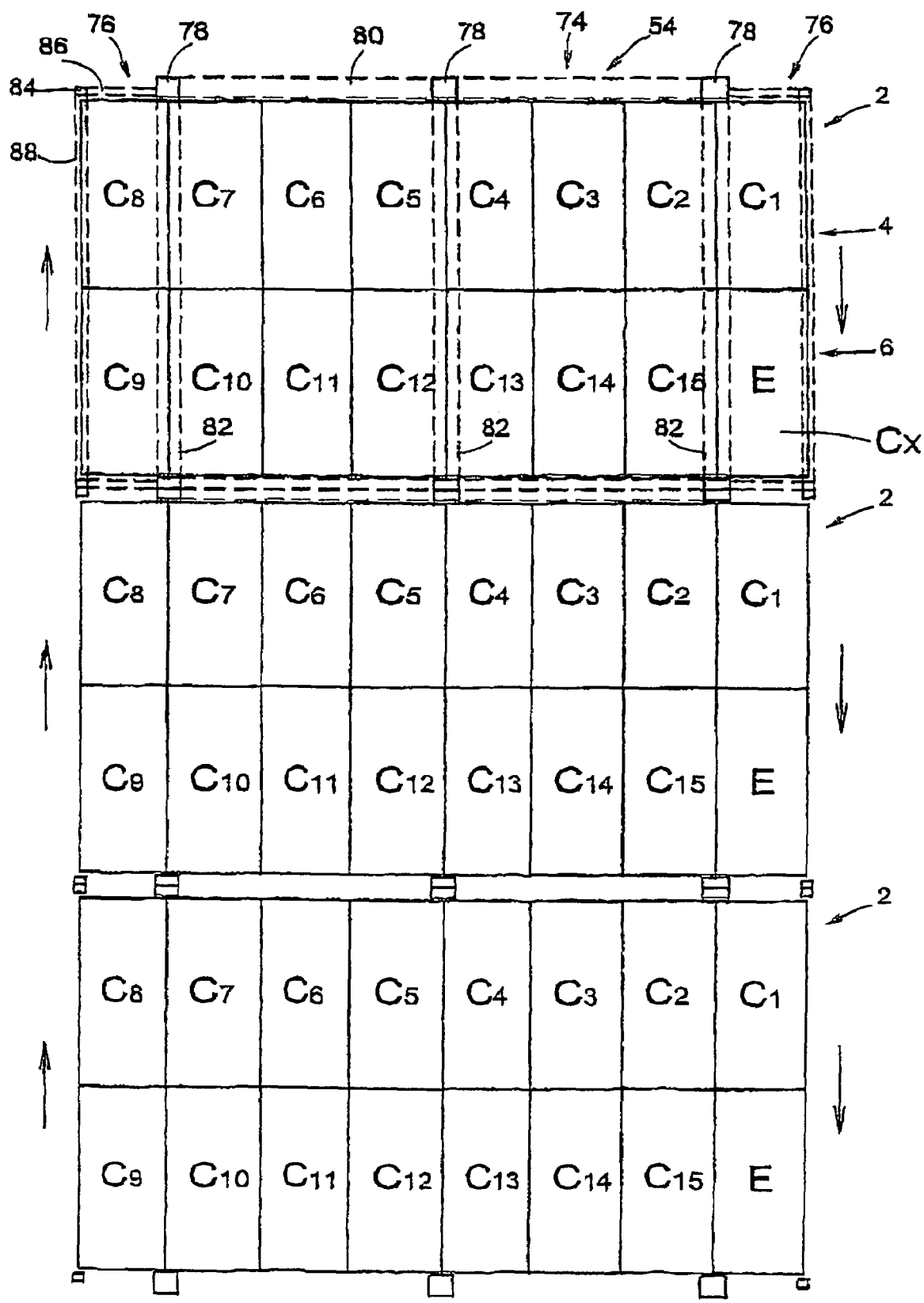
FIG. 10 shows, in a view along the line X—X of FIG. 9, a part of a container rack.

According to the invention, a container rack 50 according to the invention, as schematically shown in side and top plan view in FIGS. 9 and 10, is of modular design, the modules being designed such that their parts can be stored in standard containers, such as ISO-containers, standard sea containers and/or the like, in particular in containers C with dimensions such as can be stored in the container racks 50 which can be built up with the modules. This holds true for the rails 28 and carrier constructions 52 therefor, as schematically shown in FIG. 5, as well as for the trolleys 14, as schematically shown in FIG. 6, but also for the construction of frames 54, as will be further elucidated on the basis of FIGS. 9 and 10.

Figure 5:
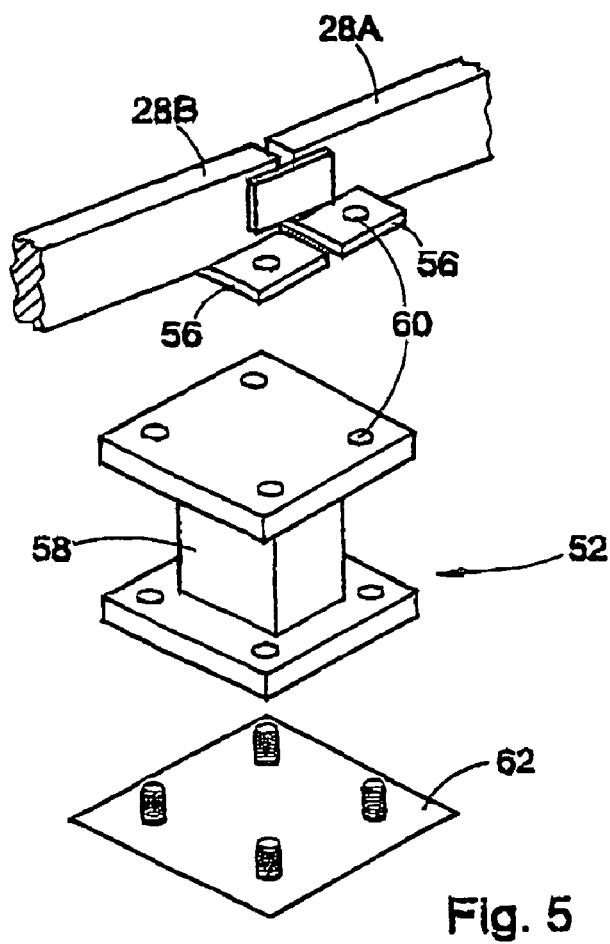
FIG. 5 shows, in perspective view, a part of a number of modules for building up an apparatus according to the invention.

FIG. 5 shows two rail sections 28a, 28b, which, near their ends, are provided with flanges 56, with which they can be fixed to a trestle 58 in a simple manner, for instance with the aid of bolts and nuts through holes 60. The trestles 58 can, for instance, be screwed onto foundation plates 62, which foundation plats 62 can be anchored to the ground 64, but also to beams of the frame 54. The rail segments 28a, b have lengths which fit within the containers C.

Figure 6:
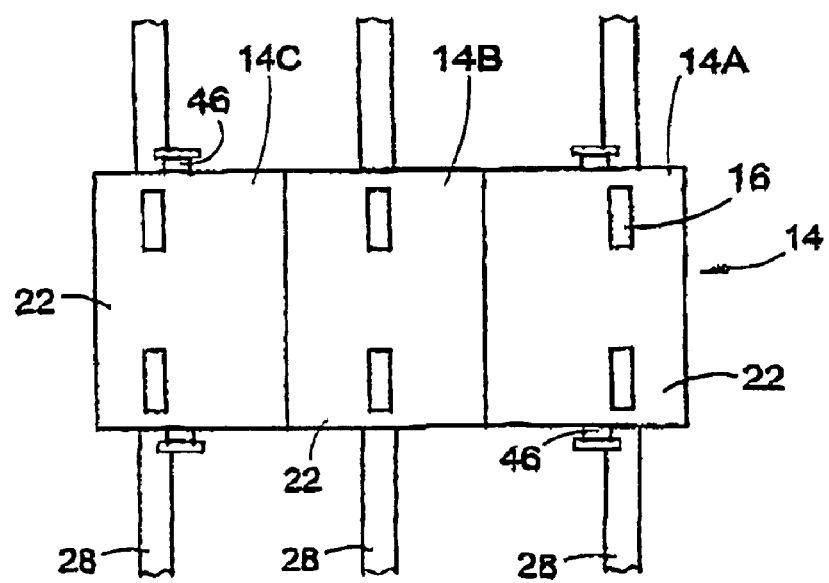
FIG. 6 schematically shows, in top view, a trolley on a number of rails according to the invention.

According to the invention, a trolley 14 can be built up from modules 14a–14c, as represented in FIG. 6, which modules each have dimensions such that they can be stored in the containers C, which modules can already be provided with wheels 16, shock elements 46 and the like. The upper surfaces 22 of the modules 14 thus form the desired arrangement position for a container C.

Figure 7:
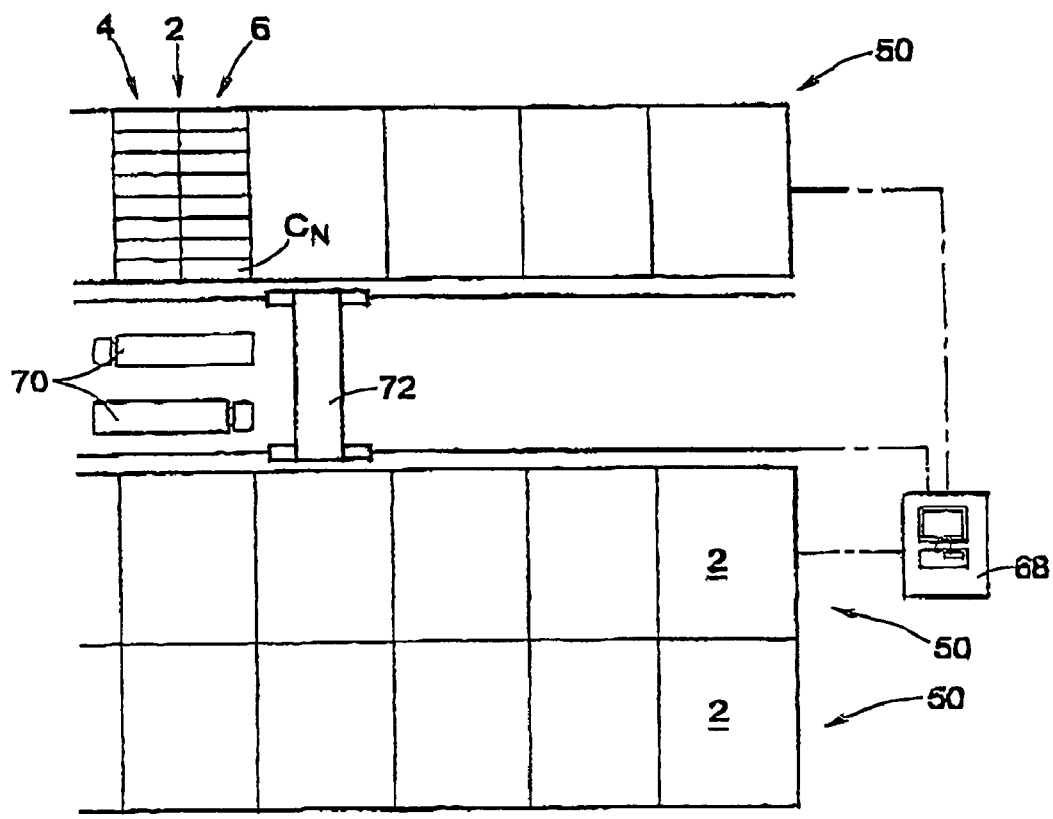
FIG. 7 schematically shows, in top view, a part of an apparatus according to the invention.
Figure 8:
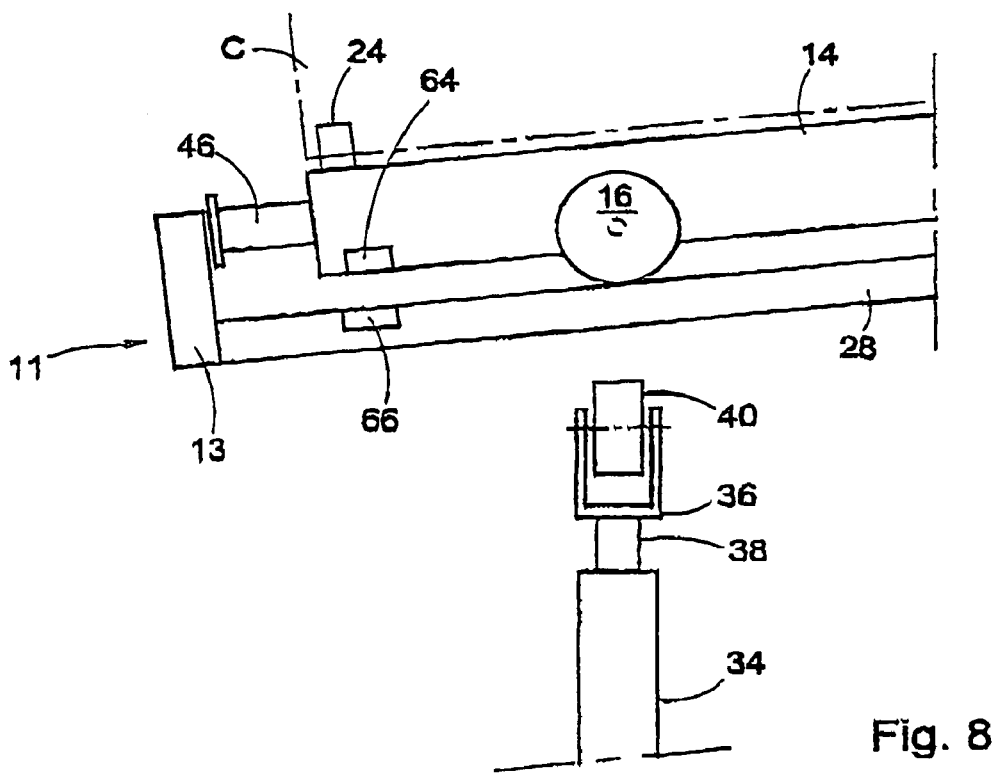
FIG. 8 schematically shows, in side view, a part of a rail as shown in FIG. 3, in an alternative embodiment.

As is schematically shown in FIG. 8, each trolley 14 can be provided with a first sensor 64, for instance on the bottom side facing the rail 28, while near the rail 28 a second sensor 66 is disposed, for instance near a bottom end 11 thereof. When the trolley 14 with the stop block 46 rests against an end stop 13 of the rail 28, the first sensor 64 and the second sensor 66 are situated opposite each other, such that the first sensor 64 can be detected by the second sensor 66, for instance for giving a position identification number. Thus, the trolley 14 is identifiable by the second sensor 66. As is shown in FIG. 7, the second sensor 66 is coupled to a central control unit 68, for instance a computer, in which it can be accurately monitored in which location within which unit 2 the respective trolley 14 is located. Further, in the central control unit 68, it is recorded which container C is placed on the respective trolley 14. Thus, it is achieved that the location of each container C within a container rack 50 is centrally recorded. When a truck 70 reports at the central control unit 68 to pick up a container Cn, the truck 70 can be automatically directed to the correct unit 2, while, additionally, the respective container Cn can be moved in that unit 2 to a position for release near an end of a row 4, 6, in the earlier described manner. With a container crane or a like suitable removal means, positioned between two container racks 50, the respective container Cn can be removed and placed on the respective truck 70. In a comparable manner, a truck with a container C can be directed by the central control unit 68 to a unit 2 for disposing therein, with the container crane 72, the container supplied by the truck 70. Thus, a particularly simple, practically automatic logistic system is obtained. It is preferred that the container crane 72 is also controlled by the central control unit 68.

In FIGS. 9 and 10, in side and top view along the line X—X of FIG. 9, a part of a container rack 50 according to the invention is shown. On the basis thereof, the structure thereof will be described.

FIG. 10 shows, in top plan view, three container arrangement units 2, in this embodiment each provided with sixteen container arrangement positions $C_x$ with fifteen trolley 14. The container arrangement positions $C_x$ are disposed in two rows 4, 6 within the unit 2, and can be controlled in the earlier described manner.

Each unit 2 comprises a frame 54, built up from a central part 74 and two end parts 76. In the embodiment shown, the central part 74 comprises six uprights 78, mutually connected near their top ends by girders 80 extending parallel to the longitudinal direction of the rows 4, 6, and second girders 82, extending at right angles thereto. Thus, in principle, a self-supporting portal construction is obtained. Optionally, between the first and/or second girders 80, 82, floors, further bearing girders or the like can be supported, on which rails 28, piston-cylinder assemblies 34, 38 and the like can be supported. Naturally, these can also be supported on the first and/or the second girders 80, 82. The uprights 78 and the girders 80, 82 are standard modules, for instance standard profiles with suitable coupling flanges, so that these can be fixed against each other with the aid of techniques known per se, for instance welds, bolt connections, riveted joints or the like. The uprights and girders have lengths such that they can easily be stored in the containers C.

As is clear from FIG. 9, the load bearing capacity of the uprights 78 and girders 80, 82 decreases according as a higher level $V_1$–$V_4$ of the container rack 50 is built up therewith. In FIG. 9, four levels $V_1$–$V_4$ are shown. It will be clear, however, that also different numbers of levels can be provided. Each portal-shaped central part 74 is calculated such that it can support the levels V with units 2, filled with containers C, resting thereon. The end parts 76 are built up from considerably lighter uprights 84 and girders 86, 88, so that a relatively simple, light construction is obtained. These uprights 84 and girders 86, 88 are also designed as standard modules and can be stored in a container C, which can be stored in a container rack 50 according to the invention.

The construction of a container rack 50 according to the invention should preferably be carried out as follows:

A top level $V_4$ is built up, from a central part 74 and end parts 76, in which a unit 2 is constructed. Subsequently, this level $V_4$ is pushed or lifted upwards, after which the third level $V_3$ is constructed underneath, again with a portal-shaped central part 74, end parts 76 and a unit 2. The load-bearing capacity of at least the central part 74 is greater than that of the level $V_4$ to be supported by it. Subsequently, these two levels $V_4$, $V_3$ are lifted and a second level $V_2$ is constructed underneath the third level $V_3$. In this manner, at all times, a level can be added from the bottom side. This means, moreover, that, during use, the capacity of a container rack 50 according to the invention can be adjusted, in particular extended, in a simple manner by adding an extra level ($V_0$) between the ground 64 and the lower level $V_1$. In the embodiment shown, in particular the central parts 74 of the frame 54 are portal-shaped, with a U-shaped cross section formed by the uprights and girders. The uprights 78 are fixed onto girders 80, 82 of an underlying level V or to the ground 64 on a suitable foundation (not shown). It will be clear, however, that these frame parts, in particular the central parts 74 and/or the end parts 76, can also have a substantially box-shaped design, by also connecting the lower ends of the uprights 78 with girders. This yields completely self-supporting frame parts which can be stacked onto each other.

Since the central parts 74, optionally together with the end parts 76, are at least substantially self-supporting, units 2 can be stacked on top of each other and, subsequently, towers of units 2 can be disposed next to each other, as is, for instance, shown in FIG. 10. Additionally, these can each have a different number of levels. It will be clear that each desired number of units 2 can be disposed on and/or next to each other, while units 2 can also be turned so as to face each other with ends 11, for instance, as is shown in FIG. 7.

Since all modules, i.e. all parts from which a container rack 50 according to the invention can be built up, can be stored in standard containers C, in particular containers which can be used in the respective container rack 50, it can be simply calculated remotely for a container rack to be built how many containers it must be possible to store therein, which modules are necessary to that end, an how its foundation needs to be designed, after which the suitable number of modules can be packaged in containers C and be transported in existing logistic systems to the location where the container rack 50 is to be constructed, at which location the latter can simply be assembled. Then, the containers C are able for storage and transport of goods, again within existing logistic systems. In this manner, considerable savings in costs are achieved. Moreover, in the same manner, extension of the container racks can be provided for in a simpleman-ner.

The invention is not in any way limited to the exemplary embodiments shown in the specification and the drawings. Many variations thereon are possible within the scope of the invention outlined by the claims.

Each unit 2, for instance, can comprise a different number of container arrangement positions, while, further, optionally, several rows can be provided next to each other. In the exemplary embodiments shown in FIGS. 9 and 10, each end part 76 comprises two container arrangement positions next to each other, while the remaining container arrangement positions are situated in the central part 74. It will be clear that a different lay-out can also be here. For instance, optionally, all container arrangement positions are provided within the central part, while in the end parts means can be provided for placing or taking out containers which, subsequently, can be moved to a truck or can be moved through end parts situated next to and/or above each other, with the aid of, for instance, guide rails and elevators extending therethrough. Thus, it can be provided that from each container arrangement position $C_x$, a respective container can be brought to a central take-out location or can be brought from these take-out locations to a random or specific container arrangement position Cx within the container rack 50. Further, other means can be provided for moving containers within the units 2 and/or the container racks 50. For instance, the trolleys 14 can rest, with their lower side, on roller tracks instead of on rails, while the wheels 16 of the trolley 14 can be omitted. Also, in lighter embodiments, optionally slide rails with sliding trolleys can be provided. To locate containers with the aid of a central control unit, use can be made of already existing localization systems for containers, such as, for instance, GPS-based systems, with which, in a simple manner, the location of each container within the respective container rack can be determined. In the exemplary embodiments shown, the rails 28 of the rows 4, 6 have identical, fixed angles of inclination. It will be clear that this angle of inclination can be chosen in a simple manner depending on the container to be placed, while it can also be designed to be adjustable, so that speeds of movement of the containers can be controlled in a simple manner. In or near the rails and/or on the trolleys, simple means can be provided for slowing down, blocking and releasing the trolleys. A container rack according to the invention can also be built up in a traditional manner, from bottom to top.

In this description, container racks are shown and described for use with containers, in particular standard containers such as ISO-containers, sea containers and the like. It will be clear, however, that container racks according to the invention can also be simply designed for storing and releasing different containers such as medium bulk containers, crates, boxes and the like, for instance in storage rooms.

These and many comparable variations are understood to fall within the scope of the invention outlined by the claims.

The invention claimed is:

1. A method for forming an apparatus for storing and releasing containers or like substantially box-shaped storing devices, the apparatus comprising at least rails having thereon a series of trolleys movable on said rails, on which trolleys the containers can be carried, the rails being supported by a supporting frame, wherein the method comprises the steps of:
   remotely determining for a location, how many containers are to be potentially storable in the apparatus;
   remotely determining a suitable number of standard modules required for construction of a supporting frame for the apparatus;
   packaging the determined number of standard modules;
   transporting said modules to said location; and
   constructing said supporting frame for the apparatus from at least the modules at said location.

2. A method according to claim 1, wherein the number of containers is entered in a computer, which comprises data about the respective modules as well as about at least static and dynamic loads occurring in devices of said type, the computer being designed to calculate the desired construction and the number of modules necessary therefor, on the basis of said number, the data concerning the modules and the expected static and dynamic load, after which a parts list is determined for the required construction.

3. A method according to claim 2, wherein said parts list is drawn up by said computer.

4. A method according to claim 1, wherein the modules are packaged and transported to said location in standard containers which are to be stored in the apparatus.

5. A method according to claim 1, wherein, at said location, a foundation is formed, while attachment points are calculated for the modules on the basis of the calculated construction.

6. A method according to claim 1, wherein, on the basis of the expected number of containers to be stored in the respective construction, the necessary number of trolleys is determined, which trolleys are transported to said location, preferably in standard containers, optionally in parts.

7. A method according to claim 1, wherein said construction is built up, while a container crane is moveably disposed such that it is mobile along at least one input side of the construction.

8. A method according to claim 1, wherein at least two constructions are built up at said location, which constructions are disposed facing each other with an input side, such that therebetween a corridor is kept free in which transport units for said containers can be driven, while containers can be lifted from the constructions onto said transport units, and containers can be lifted off said transport units into said constructions.

9. A method according to claim 1, further comprising the steps of loading and unloading containers or like storing devices, wherein rows or container racks are disposed, wherein a vehicle, when approaching the container racks, is assigned at least one position indication number, corresponding to at least one container position, after which the vehicle is driven to said container position and a container is brought from the vehicle into said container position or a container is brought from said container position onto said vehicle.

10. A method according to claim 9, wherein said position indication number is assigned by a computer, and wherein an identification number of each container in a container position in the container racks, is recorded in the computer, said identification number corresponding to its location in the container racks, on the basis of which the container identification number is assigned.

11. An apparatus comprising a series of container racks and a computer, means being provided for assigning computer-stored identification numbers to containers to be received in container positions of the container racks, positioning means being provided for taking out containers from a container rack or positioning a container in a container rack on the basis of an identification number.

12. An apparatus according to claim 11, wherein each container rack comprises a series of trolleys, mobile within the container rack, means being provided for monitoring, with the aid of the computer, the position of the trolleys within the container rack, coupled to an identification number of a container possibly loaded on the trolley and control means for controlledly directing a specific trolley to a releasing device.

* * * * *

UNITED STATES PATENT AND TRADEMARK OFFICE
CERTIFICATE OF CORRECTION

PATENT NO.        : 7,035,713 B2
APPLICATION NO.   : 10/475259
DATED             : April 25, 2006
INVENTOR(S)       : Hoogland Page 1 of 1

It is certified that error appears in the above-identified patent and that said Letters Patent is hereby corrected as shown below:

IN THE SPECIFICATION:

Column 4, line 6,    now reads "Dutch patent 1013683"
                     should read --Dutch patent 1012682--

Column 4, line 26,   now reads "foundation plats 62"
                     should read --foundation plates 62--

Column 6, line 28,   now reads "for in a simplemanner"
                     should read --for in a simple manner--

Signed and Sealed this

First Day of August, 2006

JON W. DUDAS
*Director of the United States Patent and Trademark Office*